Jan. 18, 1944.  F. E. ARNDT  2,339,667
MATERIAL SPREADER
Filed Feb. 26, 1941  3 Sheets-Sheet 1

INVENTOR:
FRANKLIN E. ARNDT,
By Chas. M. Nissen,
ATTY.

Jan. 18, 1944.     F. E. ARNDT     2,339,667
MATERIAL SPREADER
Filed Feb. 26, 1941     3 Sheets-Sheet 2

Fig. 4

INVENTOR:
FRANKLIN E. ARNDT,
By Chas. M. Nissen,
ATT'Y.

Jan. 18, 1944. F. E. ARNDT 2,339,667
MATERIAL SPREADER
Filed Feb. 26, 1941 3 Sheets-Sheet 3

INVENTOR:
FRANKLIN E. ARNDT
By Chas. M. Nissen,
ATT'Y

Patented Jan. 18, 1944

2,339,667

UNITED STATES PATENT OFFICE 2,339,667

MATERIAL SPREADER

Franklin E. Arndt, Galion, Ohio, assignor to The Galion Iron Works & Manufacturing Company, a corporation of Ohio Application February 26, 1941, Serial No. 380,681

19 Claims. (Cl. 221—145)

My invention relates to road material spreaders of the type which is adapted to be hitched to and hauled behind a dumping truck traveling along a roadway, and one of the objects of the invention is the provision of improved valve mechanism and means for adjusting the same from the lateral ends of the hopper of the spreader so as to vary the amount of material delivered from the spreader while traveling along the roadway.

Another object of the invention is the provision of manual means for quickly adjusting a valve approximately to a predetermined position, combined with mechanism for accurately setting the valve at such predetermined position.

Another object of the invention is the provision in combination with valve mechanism of improved feeding means adapted to be operated both when the spreader is pulled forwardly and pushed rearwardly along the roadway.

A further object of the invention is the provision of a feed roll and valve mechanism adjustable relative thereto in combination with the hopper of a spreader, so as to secure by means of the feed roll a distribution of the spreading of the material in accordance with the adjustment of the valve mechanism.

Other objects of the invention will appear hereinafter, the novel features and combinations being set forth in the appended claims.

This application is a continuation in part of my co-pending application, Serial No. 282,242, filed June 30, 1939, now Patent No. 2,309,086, granted January 26, 1943, for an improvement in Material spreaders, which application was filed as a continuation in part of another of my co-pending applications, Serial No. 131,837, filed March 19, 1937, now Patent No. 2,252,690, granted August 19, 1941, for an improvement in Material spreaders.

In the accompanying drawings.

Figure 1:
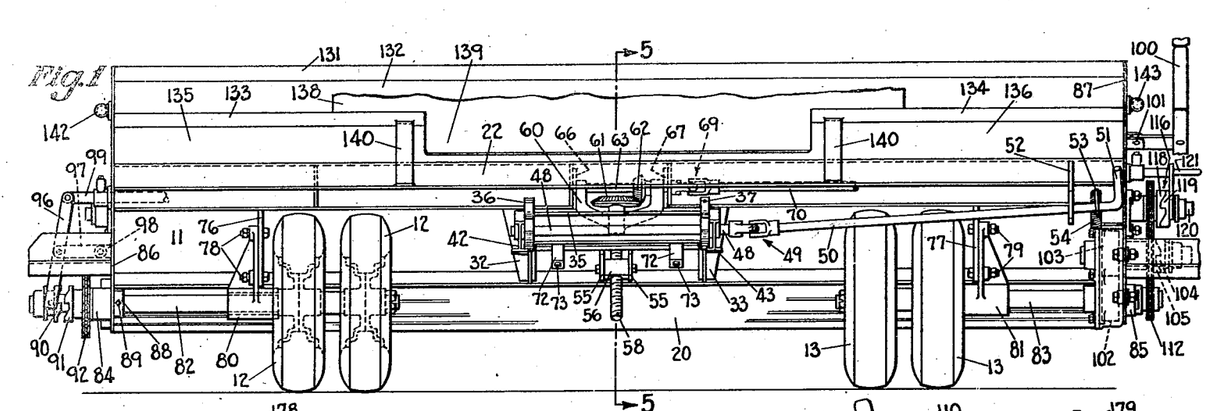
Fig. 1 is a front elevation of the spreader embodying my improvements.
Figure 4:
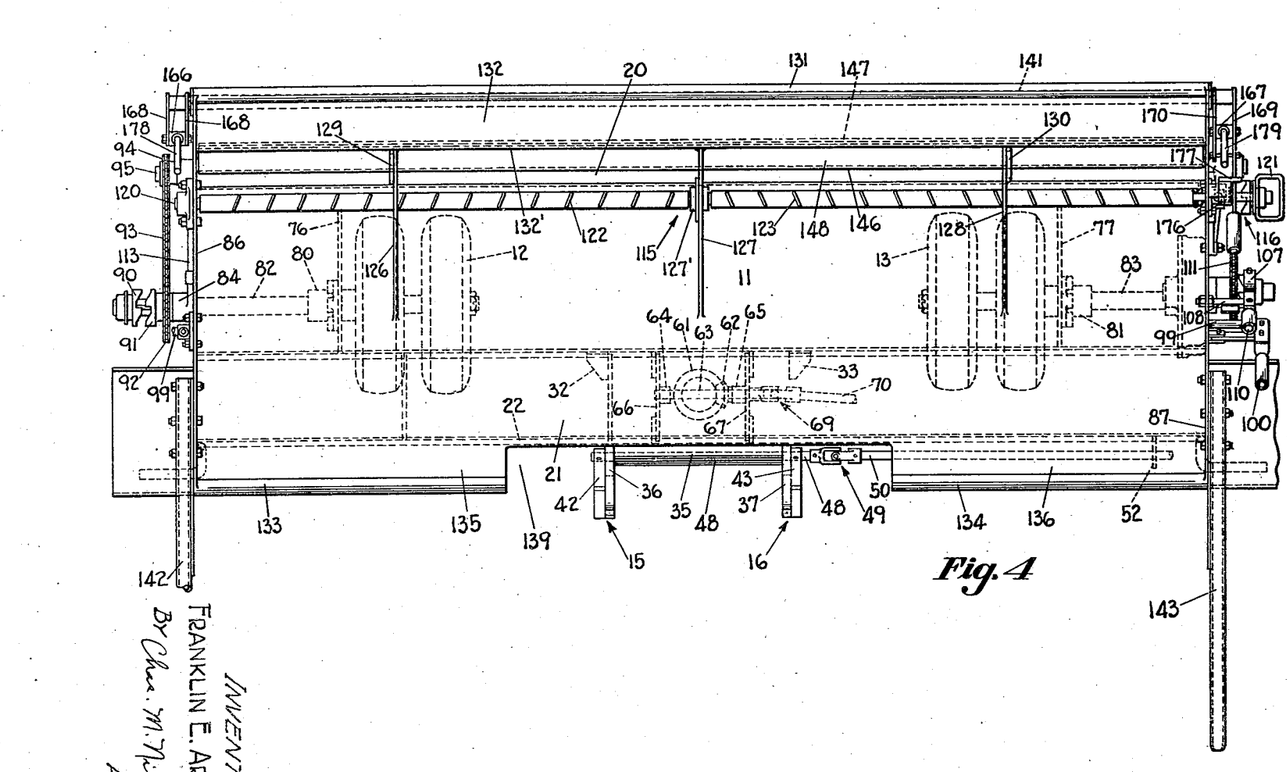
Fig. 4 is a plan view of the spreader shown in front elevation in Fig. 1.
Figure 5:
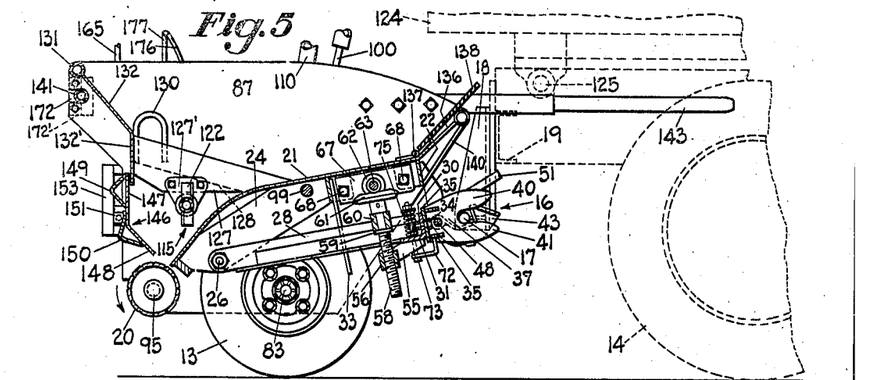
Fig. 5 is a sectional elevation taken on the line 5—5 of Fig. 1, looking in the direction of the arrows.
Figure 6:
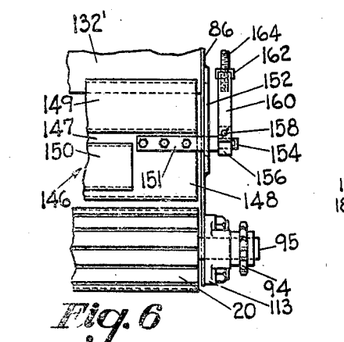
Fig. 6 is an enlarged rear elevational view of one end portion of the valve and the parts with which it is associated.

The hopper 11, as shown in Figs. 1 and 4, is adapted to extend substantially beyond both sides of the draft vehicle or self-propelled hauling dumping truck shown in dashed lines in Fig. 5. The hopper 11, as shown in Figs. 1 and 4, is supported upon the wheels 12, 13 which are set inwardly from the vertical end walls of the hopper so as to track just outside or just inside of the paths of travel of the wheels 14 of the truck shown in dashed lines in Fig. 5. That is to say, when hitching devices 15 and 16 at the front side of the spreader are connected, as shown in Fig. 5, to the drawbar 17 secured by means of the bracket structure 18, 19 to the rear end of the dumping truck, the wheels 12 and 13 of the spreader will travel along paths immediately outside or immediately inside of the paths of travel of the wheels 14 of the dumping truck.

The hopper 11 comprises an open top and an open bottom and below the latter is located the feed roll 20. The bottom wall 21 of the hopper slopes downwardly from the cross-piece 22 to the feed roll 20, as shown in Fig. 5. On the underside of the bottom wall 21 are secured by means of welding, the bracket plates 24 to which are pivoted at 26 rearwardly extending arms of a supporting frame structure 28. This frame structure may comprise various plates welded together into one rigid unit as shown in Fig. 5, and includes a vertical front cross-piece 30 and a horizontal front cross-piece 31.

Secured to the bottom of the hopper are vertical plates 32 and 33 at opposite sides of the frame structure 28, as shown in Figs. 4 and 5. The depending plates 32, 33 act as guiding abutments for the frame structure 28 to confine the latter to upright adjustments on the pivots 26.

Figure 2:
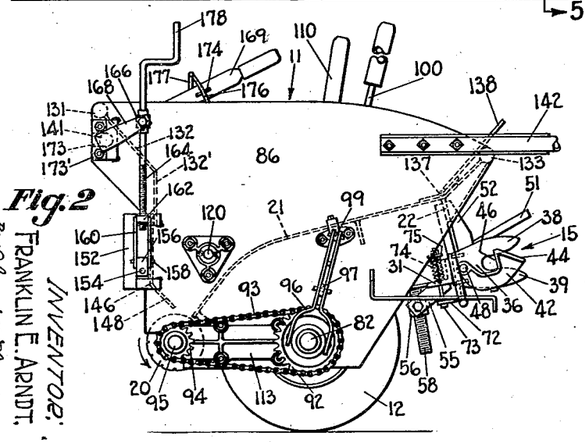
Fig. 2 is an elevational view of the left-hand end of Fig. 1.
Figure 3:
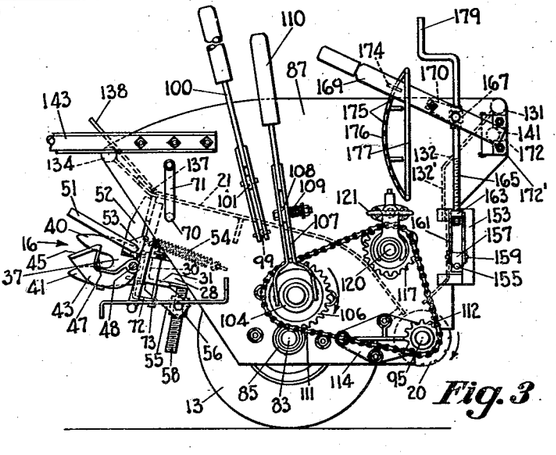
Fig. 3 is an elevational view of the right-hand end of Fig. 1.

Pivoted at 34 to the center of the upright plate 30 is a cross-piece 35, U-shaped in cross-section as shown in Fig. 5. Welded to the ends of the crosspiece 35 are the upright jaw plates 36, 37, each having spaced-apart upper and lower fixed jaws. The jaw plate 36 comprises the upper jaw 38 and the lower jaw 39, as shown in Fig. 2. The jaw plate 37 comprises the upper jaw 40 and the lower jaw 41, as shown in Fig. 3. The jaws 38, 39 and 40, 41 are beveled to facilitate positioning of the drawbar 17, as shown in Figs. 2 and 3.

On the outside of the jaw plates 36, 37 are located the beveled latch plates 42, 43, as shown in Figs. 1 and 4. The latch plates 42, 43 are beveled at 44, 45 respectively, as shown in Figs. 2 and 3. The latch plates are also provided with hooking surfaces at 46, 47 in order to hold the drawbar 17 in the locked position shown in Fig. 5.

As shown in Fig. 4, the latch plates 42, 43 are pinned to the rock shaft 48 which is journaled in openings which extend laterally through the jaw plates 36, 37.

As shown in Fig. 1, the rock shaft 48 is connected by means of a universal joint 49 to the actuating rod 50 which is provided with a handle 51 within easy reach of the operator at the right-hand end of the spreader, as viewed in Fig. 1.

Secured to the upper front edge portion of the hopper is a bracket plate 52 provided with an opening for receiving the rod 50 so that the latter may have a journal support to co-operate with the universal joint 49 to support the rod 50 in the position shown in Fig. 1. Secured to the rod 50 is a bracket plate 53 to which is connected a spring 54, the lower end of which is secured below the bottom of the hopper near the right-hand end thereof as viewed in Fig. 1.

It can readily be seen by referring to Fig. 1 that when the rod 50 is rotated by means of the handle 51 in an anti-clockwise direction as viewed by the operator, the latch plates 42, 43 will be moved downwardly into positions to release the drawbar 17 (Fig. 5). When the handle 51 is released, the spring 54 will automatically return the latch plates to the position shown in Figs. 2 and 3. When the hitching devices are at a proper elevation from the road surface, the spreader may be pushed forward so that the beveled surfaces 44 and 45 of the latch plates will engage the drawbar 17 whereupon the latch plates will be automatically depressed against the action of the spring 54 until the drawbar 17 is in the position shown in Fig. 5, whereupon the spring 54 will snap the latch plates into their locking positions.

In order to enable the drawbar 17 to be secured to the rear end of the dumping truck at fixed elevation relative to the road surface and to save the time necessary to adjust the elevation of the drawbar 17 relative to the road surface, I have provided means for adjusting the elevations of the hitching devices so as to be in accordance with the elevation of the drawbar on the dumping truck. Secured to and depending from the crosspiece 31 of the frame structure 28 are spaced-apart bracket plates 55, 55 between which is swiveled a nut 56, as shown in Figs. 1, 2, 3 and 5. Threaded through the nut 56 is the upright screw-threaded shaft 58. At the upper end of the screw-threaded portion of the shaft 58 is a collar 59 for supporting the double arm bracket 60. Immediately above this collar the shaft 58 is journaled in the lower end of the bracket 60. To the upper end of the shaft 58 is keyed a bevel gear 61 which meshes with another bevel gear 62 fixed to the shaft 63, the ends of which are journaled in the bearings 64, 65 at the upper end portion of the bracket 60, as shown in Figs. 1 and 4.

The upper outer ends of the journal bearings 64, 65 are in turn journaled in openings in the plates 66, 67, as shown in Fig. 4. The plates 66, 67 are rigidly secured to the bottom plate 21 of the hopper and this may be done by means of bolts, as illustrated at 68, 68 in Fig. 5.

By means of a universal joint 69, the shaft 63 is connected to the actuating rod 70. The rod 70 may be extended through an opening in one of the lateral end walls of the hopper to an actuating handle 71 shown in Fig. 3.

When the spreader is to be hitched to the towing truck, the drawbar 17 may not be in parallelism with the rock shaft 48 but such parallelism may be effected since the cross-piece 35 is pivoted at 34 to the front end of the frame structure 28. L-shaped brackets 72, 72 are secured to the underside of the cross-piece 35, as shown in Figs. 1 and 5, and these brackets extend rearwardly. Bolts 73 extend upwardly through the rearwardly extending portions of the brackets 72 and through openings in the plate 31. Springs 74 surround the bolt and rest on the plate 31 below the washers 75. When the cross-piece 35 is tilted on the pivot 34 one or the other of the springs 74 is compressed and consequently when hitching is effected with the drawbar 17 and rock shaft 48 out of parallelism, undue strain will not be transmitted to the frame structure 28 or to the hopper structure. Furthermore, the springs 74 always tend to center the cross-piece 35 or hold it in parallelism to the cross-pieces 30, 31. It will also be seen that when the towing truck travels along the roadway and the drawbar 17 tilts transversely thereof, the springs 74 act as shock absorbers between the rear end of the truck and the hopper structure.

Secured to the under side of the hopper are the bracket plates 76, 77, as shown in Fig. 1. Bolted at 78, 79 to the bracket plates 76, 77 are the journal bearings 80, 81 for the inwardly extending supporting wheel shafts 82, 83. The wheels 12 and 13 are keyed to the shafts 82 and 83 to rotate therewith.

The outer ends of the shafts 82 and 83 are journaled in bearings 84, 85 which are secured to the end walls of the elongated hopper. Bearing against the inner wall of the end plate 86 of the hopper is a collar 88 which is secured to the shaft 82 by means of a set screw 89, as shown in Fig. 1.

Splined to the outer end of the shaft 82 is a jaw clutch element 90, as shown in Fig. 1. Associated with the jaw clutch element 90 is a slip clutch element 91 which is loosely journaled on the shaft 82. The slip clutch element 91 is connected to the sprocket 92. As shown in Fig. 2, the sprocket 92 is connected by means of the sprocket chain 93 to the sprocket 94 secured to the shaft 95 of the feed roll 20. A shipper 96 is connected to the jaw clutch 90, as shown in Figs. 1 and 2. Intermediate the ends of the shipper is a pivotally connected link 97, the inner end of which is pivotally connected to a bracket 98 on the outer wall of the hopper end plate 86. To the upper end of the shipper 96 is pivotally connected a rod 99 which is adapted to extend under the bottom plate 21 to the other end of the spreader within easy reach of the operator. As shown in Fig. 3, the rod 99 is pivotally connected to the lower end of a shifting lever 100 which is fulcrumed at 101 to the outer side of the hopper end plate 87.

The right-hand end of the shaft 83, as viewed in Fig. 1, is connected through reversing gearing 102, 103 to a shaft on which is splined a jaw clutch element 104. Associated with this jaw clutch element is a slip clutch element 105 which is connected to the sprocket 106. By means of a shipper 107 connected to the jaw clutch element 104, the latter may be moved into or out of engagement with the slip clutch element 105. The shipper 107 comprises two plates between which extends the fulcrum element 108 on the outer wall of the hopper end plate 87. A spring 109 holds the resilient straps of the shipper 107 in frictional engagement with the mounting 108 so that when the operator releases the handle 110, the clutch will remain applied or released.

As shown in Fig. 3, the sprocket 106 is connected by means of the sprocket chain 111 to the sprocket 112 on the feed roll shaft 95. Reinforcing plates 113 and 114, as shown in Figs. 2 and 3, may be used for securely mounting the journal bearings for the roller shaft 95 in desired association with the discharge opening in the bottom of the hopper.

It should be particularly noted that the feed roll 20 always rotates in delivery direction whether the spreader is moved forwardly or rearwardly along the roadway. That is to say, the feed roll 20 always rotates in the direction of the arrow shown in Fig. 3 or in the direction of the arrow shown in Fig. 2, irrespective of the direction of travel of the spreader. When the spreader is pulled forwardly or to the left, as viewed in Fig. 3, the clutch element 104 will be rotated in a clockwise direction as viewed from the right-hand end of Fig. 1. When the handle 110 is moved away from the plate 87, the clutch element 104 engages the jaw clutch 105 and the sprocket 106 will be rotated in the direction of the arrow shown in Fig. 3 and consequently the feed roll 20 will be rotated in a clockwise direction as viewed in Fig. 3.

When the spreader is moved rearwardly with the clutch elements 104 and 105 still in engagement, the clutch element 104 will be automatically slipped off the clutch element 105. Only by throwing in the clutch 90, 91 can the feed roll 20 be rotated when the spreader is moved rearwardly. By moving the lever 100 away from the plate 87, the rod 99 will be pushed to the left as viewed in Fig. 1, and the clutch elements 90, 91 brought into engagement, whereupon the rearward rotation of the wheels 12 will cause anti-clockwise movement of the sprocket 92, as viewed in Fig. 2, and this will effect rotation of the feed roll 20 in an anti-clockwise direction as viewed in Fig. 2 or in a clockwise direction as viewed in Fig. 3. It will thus be seen that the feed roll 20 will always be rotated in feeding direction whether the spreader is moved forwardly or rearwardly.

Uniformity of direction of rotation of the feed roll 20 is taken advantage of in securing rotation of the agitator 115 always in the same direction, irrespective of the direction of travel of the spreader along the roadway. Moreover, the slip clutch 116 assures uniformity of rotation of the agitator 115. The sprocket chain 111 is extended around the sprocket 117, as shown in Fig. 3. Connected to the sprocket 117 to rotate therewith is a slip clutch element 118. The jaw clutch element 119 is splined to the shaft 120 of the rotary agitator 115. By means of a loop handle 121, the clutch element 119 may be applied or released.

It can readily be seen by referring to Figs. 1 and 3 that since the feed roll 20 always rotates in the same direction, the sprocket 117 will always be rotated in a clockwise direction as viewed from the right-hand end of Fig. 1. Such direction of rotation is desirable because the rotary agitator comprises diagonally extending paddles 122, 123 so distributed and arranged as to convey some of the material from the middle of the hopper toward the outer lateral ends thereof. Such conveying action in opposite directions from the middle of the hopper is desirable, particularly when the hopper is elongated on both sides of the path of travel of the towing truck. In other words, when the load carrying body 124 is tilted on its pivot 125 (Fig. 5) to dumping position, such body is narrow relative to the transverse length of the hopper. As the material is received from the dumping truck, the spread of such material to the lateral ends of the hopper is greatly facilitated by the conveying action of the rotary agitator.

Inasmuch as the hopper is elongated across the roadway, the rotary agitator 115 is journaled not only in the end plates of the hopper but also in one or more spaced-apart vertical reinforcing plates 126, 127 and 128, as shown in Fig. 4. The vertical reinforcing plates 126, 127 and 128 are welded at their ends to inner walls of the hopper, but it should be particularly noted that these reinforcing plates are shallow in depth and are located intermediate the bottom and top of the hopper. The middle reinforcing plate 127 may have the shape shown in Fig. 5 in full lines and this plate may support the journal bearing 127' for the shaft 120 of the rotary agitator 115. The reinforcing plates 126 and 128 each has the shape indicated by the dotted line in Fig. 5. Therefore, as shown in Figs. 4 and 5, the agitator extends under the plates 126 and 128 and the shaft of the agitator is journaled in the bearing 127' carried by the reinforcing plate 127. U-shaped loops 129 and 130 may be welded to the plates 126 and 128 to form lifting eyes to facilitate assembly or transportation.

Further reinforcement of the hopper may be effected by providing a pipe 131 along the entire length of the rear edge of the hopper, this pipe being welded at its ends to the end plates 86, 87 and also welded along its length to the rear upper edge of the rear inclined wall 132, as shown in Figs. 4 and 5. Reinforcing pipes 133, 134 may be welded to the upper edges of the plates 135 and 136. Hinged at 137, as shown in Fig. 5, is a sheet 138 of flexible material, such as rubber, to close the open space afforded by the cut-away portion 139 of Fig. 4. Near such cut-away portion additional support for the pipes 133 and 134 may be afforded by plate supports, shown at 140 in Figs. 1 and 5.

Handle bars 142 and 143 are connected to the front portions of the end plates 86, 87 to extend forwardly along opposite sides of the dumping truck, as shown in Figs. 1 and 4. Even after hitching has been effected, as shown in Fig. 5, the screw shaft 58 may be rotated so as to tilt the hopper on the axis of the wheels 12, 13. By referring to Fig. 5, it will be seen that if the hitching mechanism remains at fixed relation by reason of the drawbar 17 being at fixed elevation, operation of the screw shaft 58 will tilt the hopper and therefore vary the elevation of the feed roll 20. However, the main purpose of the mechanism for adjusting the elevation of the hitching mechanism is to accommodate the hitching mechanism to whatever height the drawbar of the towing truck may have, and in this way maintain the upper open side of the hopper approximately horizontal for maximum capacity when receiving material from the dumping truck.

I will now describe the mechanism for adjusting the rate of feed from end to end of the feed roll. The valve plate or feed gate 146 is located directly above the feed roll 20, as shown in Fig. 5, and extends over the full length of the feed roll between the end plates 86, 87 of the hopper. The valve plate has a vertical portion 147 and an inwardly inclined portion 148, as shown in Fig. 5. The vertical portion 147 is reinforced by having welded thereto an angle plate 149, and the inwardly inclined portion 148 is reinforced by the angle plate 150 which may have one edge welded to the bottom of the inclined portion and the other edge welded to the vertical portion 147. The vertical portion 147 overlaps the outer lower edge of the vertical wall 132' which extends downwardly from the inclined wall 132 of the hopper.

Secured rigidly to the ends of the valve plate 146 are outwardly projecting bars 151. These bars extend through brackets 152 and 153 mounted on the rear edges of the hopper plates 86, 87 to form slots or vertical guideways. Pins 154 and 155 extend outwardly from the ends of the bars 151 through blocks 156 and 157 which in turn are pivoted at 158, 159 respectively, to lifting straps 160 and 161, as shown in Figs. 2 and 3. At the upper ends of the straps 160 and 161 are nuts 162, 163 through which are threaded the vertical rods 164, 165, the shafts of which are journaled at 166 and 167 to levers or arms 168, 169 and 169, 170, which in turn are rigidly connected to the rock shaft 141 as shown in Fig. 4.

The journal bearing 167 is pivotally mounted between the arm 170 and the lever 169. The arm 170 is fixed at its right-hand end as viewed in Fig. 3, to the rock shaft 141. The arm 170 extends radially from the rock shaft 141 in parallelism with the lever 169.

The lower fulcrum end of the lever 169 is rigidly connected to one end of the rock shaft 141 which is journaled and held in the slot 172 in the end plate 87 by the keeper 172'. The opposite end of the rock shaft 141 is journaled and held in the slot 173 in the plate 86 by the keeper 173' and is rigidly attached to the arms 168, 168. Between the arms 168, 168 at their free ends is pivotally supported the journal bearing 166, as shown in Figs. 2 and 4.

It will thus be seen that when the lever 169 is lifted or lowered from the right-hand end of the spreader, as viewed in Figs. 1, 3 and 4, both ends of the valve plate 146 are lifted or lowered equally relative to the feed roll 20.

The lever 169 is provided with an inwardly extending latch 174 which is adapted to fit in any of the notches 175 of the arcuate plate 176 secured to the hopper plate 87, as shown in Fig. 3. The lever 169 extends between the guide rod 177 and the arcuate notched plate 176.

After equal adjustment has been made of both ends of the valve plate relative to the feed roll 20 by quick movement of the lever 169, the valve plate may be held in such adjusted position by the latch 174 fitting in one of the notches 175. More accurate adjustment, however, may be made by means of the screw shafts 164 and 165 at the opposite ends of the spreader, either to secure uniform feed over the entire length of the feed roll or to secure greater feed from one end portion of the feed roll than from the other end portion thereof. By means of the handles 178 and 179, as shown in Figs. 2 and 3, the ends of the valve plate may be lifted or lowered individually and therefore one end or the other of the valve plate may be moved farther away from or closer to the feed roll. After the adjustment of the valve plate 146 has been made in inclination or parallelism relative to the feed roll, the valve plate as a whole may be lifted or lowered by means of the lever 169 from the right-hand end of the spreader, as viewed in Fig. 1. For instance, the valve plate may be adjusted so that the feed may be greater on one side of the road than on the other, and then the quantity of feed may be regulated by actuating only the lever 169 without further actuation of either of the handles 178, 179.

Figure 7:
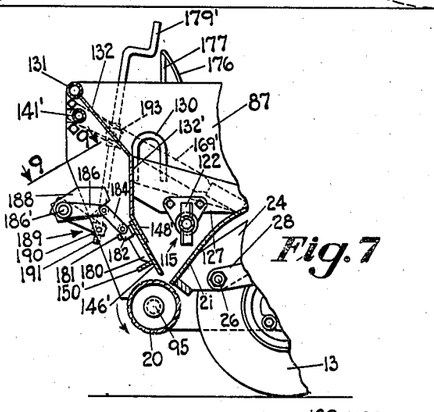
Fig. 7 is a sectional view corresponding to a portion of Fig. 5 but showing a modification of the valve structure.

I will now describe the modification of the mechanism for adjusting the rate of feed from end to end of the feed roll, as shown in Figs. 7 to 10, inclusive. The valve plate or feed gate 146' is located directly above the feed roll 20, as shown in Fig. 7, and extends over the full length of the feed roll between the end plates 86, 87 of the hopper. The valve plate or feed gate 146' is flat and rectangular in shape but on account of its length may be considered as elongated. The valve plate is reinforced by having welded thereto at right angles to its rear surface an elongated flat plate 150'.

Figures 9, 10:
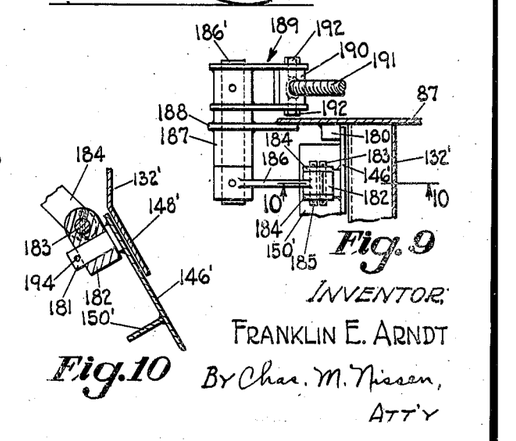
Fig. 9 is an enlarged sectional plan view taken on the line 9—9 of Fig. 7 looking in the direction of the arrows.
Fig. 10 is a sectional view taken on the line 10—10 of Fig. 9 looking in the direction of the arrows.

The rear wall 132 of the hopper has a vertical section 132' and a downwardly and forwardly inclined section 148'. The valve plate 146' overlaps and slides along the rear outer surface of the extension 148', as shown in Fig. 7. The plate 146' is confined to such position back of the section 148' by the guide block 180, as shown in Figs. 7 and 9. This guide block 180 is secured to the inner face of the end plate 87, and a similar guide block is secured to the inner face of the end plate 86 for cooperation with the other end of the plate 146'.

As shown in Figs. 9 and 10, a bearing pin 181 is rigidly secured to the rear face of the valve plate 146'. On this pin 181 is journaled a pivot block 182 to which in turn is pivoted at 183 a pair of links 184, 184, the upper ends of which are pivoted at 185 to the radial lever arm 186 which is pinned to the rock shaft 186' journaled in the bearing 187 carried by the bracket 188 welded to the end plate 87. Cotter pins may be relied on to hold the pivot block 182 in proper relation to the journal bearing 181 and the links 184, 184. A radial arm or lever 189 is pinned to the shaft 186' and has swiveled to its free end a nut 190 through which is screw threaded the rod 191. The nut 190 is swiveled to the lever 189 by means of the screws 192 (Fig. 9).

The screw-threaded rod 191 is journaled in the bearing 193 which is swiveled to the lever 169' pivoted at 141'. The screw-threaded rod 191 is provided with a handle 179' by means of which the screw-threaded rod 191 may be rotated to effect lifting or lowering of the lever 189, thereby effecting lifting or lowering of the arm 186 and the valve plate 146' connected thereto.

The valve operating mechanism shown in Fig. 7 is connected to that end of the valve plate 146' adjacent the hopper end plate 87. Similar structure may be located adjacent the other hopper end plate 86.

Figure 8:
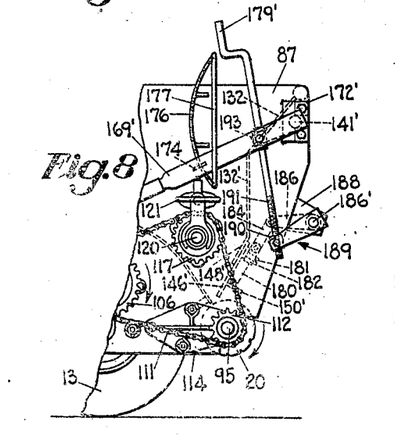
Fig. 8 is an elevational view corresponding to a portion of Fig. 3 but showing a modification of the valve adjusting mechanism.

Associated with the lever 169' on the outer face of the hopper end plate 87, is latch mechanism comprising the notched arcuate plate 176, as shown in Fig. 8.

After approximately equal and simultaneous adjustments have been made of both ends of the valve plate 146' relative to the feed roll 20 by quick movement of the lever 169', the valve plate 146' may be held in such adjusted position by the latch mechanism 176. More accurate adjustment may be made, however, by means of the screw shafts 191 at the opposite ends of the spreader either to secure uniform feed over the entire length of the feed roll or to secure greater feed from one end portion of the feed roll than from the other end portion thereof. By means of the handles 179', the ends of the valve plate 146' may be lifted or lowered individually and therefore one end or the other of the valve plate may be moved farther away or closer to the feed roll, each time by upright sliding movements along the guideways 180 fixed to the end plates 86 and 87. In other words, the valve plate may be adjusted so that the feed may be greater on one side of the road than on the other; that is, the quantity of feed may be regulated by actuating either of the handles 179' without further actuation of the handle 169'.

Inasmuch as the ends of the valve plate are movable to different distances from the feed roll 20, the pivots 181 and 183 are at right angles to each other (Fig. 10), and therefore the link straps 184 are universally pivoted to the valve plate 146'.

It should be particularly noted that the pivot blocks 182 are removably attached to the valve plate 146' by means of cotter pins, one of which is indicated at 194 in Fig. 10. The valve plate 146' may therefore be readily replaced by another of a different size when desired.

It should also be noted that the hitching mechanism shown in Figs. 1 to 5, inclusive is adapted to connect the spreader to a self-propelled dumping truck so that the rate of feed is dependent on the speed of travel of the dumping truck along the roadway. That is to say, when the body 124 of the dumping truck is tilted at such an angle as to let the material flow gradually therefrom, the speed of rotation of the feed roll 20 is in accordance with the speed of travel of the truck. The valve plate 146' should be adjusted to spread material in proportion to the speed of travel of the truck.

The agitating and lateral conveying mechanism comprising the paddles 122, 123 will be rotated in fixed relation to the rotation of the feed roll. That is, the greater the speed of rotation of the feed roll the greater will be the speed of rotation of the agitator shaft 120. (Fig. 4.) Furthermore, whether the spreader is towed forwardly by the truck or pushed backwardly thereby the paddles will always convey material toward the lateral ends of the spreader hopper so that the adjustments of the valve plate 146 or the valve plate 146' will effect more efficient regulation of the spreading of the material from a hopper of such wide expanse of roadway. It will thus be evident that the conveying agitator, the feed roll and the valve plate adjustments cooperate to secure the desired spreading of the material both as to amounts and depths of layers transversely of the roadway. That is to say, notwithstanding the wide expanse of the hopper transversely of the roadway, the material may be spread evenly to a given depth entirely across the width of travel of the hopper or a relatively thin layer may be spread on one side gradually merging into a relatively thick layer of material on the other side of the width of travel of the hopper.

When the hopper is empty, the valve plate structure shown in Fig. 5 may be readily operated as the valve plate structure shown in Figs. 7 to 10, inclusive. When adjustments are to be made from time to time while the hopper is filled with material, the operator may operate the valve structure of Fig. 7 more easily than that shown in Fig. 5, because as shown in the latter view, forwardly and downwardly inclined extension 148 must be lifted vertically against the weight of material above the same whereas in the form shown in Fig. 7 the plate 146' may slide upwardly in its own plane without lifting any material above the same.

Obviously those skilled in the art may make various changes in the details and arrangement of parts without departing from the spirit and scope of the invention as defined by the claims hereto appended, and I therefore wish not to be restricted to the precise construction herein disclosed.

Having thus described and shown an embodiment of my invention, what I desire to secure by Letters Patent of the United States is:

1. In a material spreader, the combination with a hopper having a discharge opening in its bottom, of a gate associated with such opening, a rock shaft, a manual lever connected to one end of said rock shaft, a radial arm connected to the other end of said rock shaft, auxiliary rock shafts at the ends of the hopper, a journal bearing on said manual lever, a rotatable rod journaled in said bearing and operatively connected to one of said auxiliary rock shafts, another journal bearing on said radial arm, another rotatable rod journaled in said last-named bearing and operatively connected to the other auxiliary rock shaft, and actuating connections between said auxiliary rock shafts and end portions of said gate.

2. In a material spreader, the combination with a hopper having a discharge opening, of a gate associated with such opening, means for guiding said gate in its own plane along a rear slanting wall of the hopper to enable the gate to form a downward continuation of said wall to said discharge opening, mechanisms comprising separate and independent horizontal rock shafts mounted on the lateral end walls of the hopper and connected to the end portions of the gate to enable each end of the gate from the corresponding end of the hopper to be adjusted in elevation without affecting the adjustment in elevation of the other end of the gate, and means comprising a rock shaft extending from end to end of the hopper and connecting said independent adjusting mechanisms for effecting from one end of the hopper the elevation of both ends of the gate simultaneously.

3. In a material spreader, the combination with a hopper having a discharge opening, of a gate associated with such opening, mechanisms comprising rock shafts connected to end portions of the gate at the lateral ends of the hopper for adjusting the elevation of either end of the gate relative to said hopper independently of the adjustment of the other end, one adjusting mechanism being adapted to rock the shaft at one of the lateral ends of the hopper and the other adjusting mechanism being adapted to rock the shaft at the other end of the hopper, each adjusting mechanism being operable to adjust the elevation of the adjacent end of the gate without affecting the elevation of the other end of the gate, and means connecting said adjusting mechanisms to enable both ends of the gate to be adjusted in elevation simultaneously from one end of the hopper.

4. In a material spreader, the combination with a hopper having a discharge opening, of a gate associated with said opening, mechanism for guiding said gate to move in its own plane to various elevations to adjust the opening below the same, a rock shaft extending longitudinally from one end of the hopper to the other end thereof, arms permanently secured to the rock shaft at the ends of the hopper, two lifting devices comprising additional rock shafts connecting said arms to said gate, each lifting device comprising a rotary rod and actuating mechanism, the latter being connected to said gate, and a handle connected to one of said arms to enable an operator to rock said shaft to effect simultaneous adjustment in elevation of both ends of the gate, individual and independent adjustment in elevation of the ends of the gate being effected by means of said lifting devices connected thereto.

5. In a material spreader, the combination with a hopper having a discharge opening therein, a gate associated with such opening, a main rock shaft extending longitudinally of said hopper from one end to the other, an arm secured to one end of said shaft and extending radially therefrom at one end of said hopper, a rotary crank rod suspended from said arm, nut and screw elements at the lower end of said rod, means comprising an auxiliary rock shaft connecting said nut and screw elements to one end portion of said gate, a lever secured to the other end of said main rock shaft, an additional crank rod suspended from said lever, nut and screw elements at the lower end of said additional crank rod, and means comprising another auxiliary rock shaft for connecting said last-named nut and screw elements to the adjacent end of the gate.

6. In a material spreader, the combination with a hopper, of a feed roll associated with a discharge opening in said hopper, a gate associated with said feed roll, mechanisms between the ends of the gate and the ends of the hopper for guiding said gate for up and down movements in its own plane relatively to the hopper, actuating mechanism comprising a rock shaft having spaced radial arms one of which is connected by a link to an end portion of the gate, additional actuating mechanism comprising another rock shaft having spaced radial arms one of which is connected by another link to the other end portion of the gate, and means connected to said actuating mechanisms to effect operation thereof individually to tilt the gate endwise.

7. In a material spreader, the combination with a hopper, of a discharge gate associated with a discharge opening in the hopper, mechanisms for guiding said gate relatively to said hopper for adjustment relative to the hopper of either end of the gate individually or of both ends thereof simultaneously, actuating mechanisms at the ends of the hopper each comprising a separate rock shaft connected to an end portion of the gate, means individual to each actuating mechanism to operate the latter to effect tilting of the gate endwise from either end of the hopper, and manually operated mechanism connecting said operating means to effect the adjustment in elevation of both ends of the gate simultaneously.

8. In a material spreader, the combination with a hopper, of a flat gate associated with a discharge opening in the bottom of the hopper, mechanism between the ends of said gate and the ends of the hopper for guiding the gate for adjustment in its own plane, crank arms pivotally connected to said hopper at the ends thereof, two links one pivoted to each of said crank arms, universal joints one connected between one of said links and said gate adjacent one end of the latter and the other connected between the other link and said gate adjacent the other end of the latter, each universal joint having one of its axes at right angles to the plane of the gate, and means for actuating said crank arms to effect adjustment of the elevations of the ends of the gate.

9. In a material spreader, the combination with a hopper having a discharge opening, a gate associated with said discharge opening, a universal joint at the back of said gate adjacent one end thereof, one of the axes of the universal joint being at right angles to the gate, a horizontal rock shaft parallel to said gate, a journal bearing for said rock shaft, means comprising a link for connecting said rock shaft to said universal joint, and means for rocking said shaft on an axis parallel to said gate to adjust the elevation of the adjacent end of the latter.

10. In a material spreader, the combination with a hopper having a bottom discharge opening, a flat gate associated with said discharge opening, mechanisms between the ends of said gate and said hopper for guiding the gate along the outer side of a flat lower portion of the rear wall of the hopper while in close proximity thereto and in overlapping relation therewith to enable the gate to form a downward extension of such rear wall, universal joints at the rear side of said gate one adjacent each end of the gate, two rock shafts one at each end of the hopper, journal bearings for said rock shafts, one journal bearing being mounted on one end of the hopper and the other on the other end of the hopper, links connecting said rock shafts to said universal joints, one link being adjacent one end of the gate and the other adjacent the other end of the gate, and means for rocking said shafts to secure adjustments in elevation of the ends of the gate relative to the hopper.

11. In a material spreader, the combination with a hopper having a discharge opening, of a gate associated with said opening, means for guiding said gate relatively to said hopper for adjustment in elevation of each end thereof independently of the other end, a main rock shaft extending longitudinally from one end of said hopper to the other end thereof, crank arms secured to said rock shaft at the ends of the hopper, two horizontal auxiliary rock shafts one mounted at one end of the hopper and the other mounted at the other end of the hopper but in alinement with each other, connections between said auxiliary rock shafts and the end portions of said gate, additional crank arms connected to said auxiliary rock shafts, and two lifting devices one connected between one of the first-named crank arms and one of said additional crank arms, and the other lifting device connected between the other of the first-named crank arms and the other of the additional crank arms.

12. In a material spreader, the combination with a hopper having a discharge opening therein, of a gate associated with said opennig, a rock shaft extending longitudinally of said hopper, an arm secured to one end of said shaft and extending radially therefrom at one end of the hopper, a rotary crank rod suspended from said arm, nut and screw elements at the lower end of said rod, an auxiliary rock shaft, an auxiliary arm connecting said auxiliary rock shaft to said nut and screw elements, a journal bearing for said auxiliary rock shaft and fixed to one end of the hopper, said auxiliary shaft rocking on an axis extending longitudinally of the hopper, and an additional auxiliary arm extending radially from said auxiliary rock shaft and pivotally connected to said gate, the construction and arrangement being such that the auxiliary shaft by rotating said crank rod may be rocked independently of the rocking of the first-named shaft.

13. In a material spreader, the combination with a hopper, of a feed roll associated with a discharge opening in the hopper, a gate associated with said feed roll, mechanism for guiding said gate for adjustment in elevation along upright lines of each end thereof independently of the other end, links pivotally connected to the end portions of the gate, and mechanisms comprising separate spaced-apart rock shafts journaled to said hopper at the ends thereof and connected to said links for adjusting the elevation of each end portion of the gate independently of the other end portion to adjust along upright lines the spacing between the lower edge of the gate and the feed variably along the length of the latter, one of such adjusting mechanisms being operable by rocking the shaft located at one end of the hopper and the other being operable by rocking the shaft located at the other end of the hopper, and each adjusting mechanism being operable to elevate the adjacent end of the gate along upright lines without affecting the adjustment in elevation of the other end of the gate.

14. In a material spreader, the combination with a hopper, of a feed roll associated with a discharge opening in the bottom of the hopper, a discharge gate associated with said feed roll, spaced apart links pivotally connected to said gate, arms connected to said links and journaled to said hopper, one to one end of the hopper and the other to the other end of the hopper, upright devices for guiding the ends of said gate for adjustment in elevation of either end of said gate along upright lines, manual means at one end of the hopper connected to one of said arms for actuating one of said links to adjust the elevation of the adjacent end of the gate along upright lines relative to said feed roll, and manual means at the other end of the hopper and connected to the other arm to actuate the other link to adjust the elevation of the other end of the gate along upright lines relative to said feed roll, each end of said gate being adjustable in elevation independently of the other.

15. In a material spreader, the combination with a hopper having a discharge opening in its bottom, of a feed roll associated with said discharge opening, a discharge gate forming a portion of one of the transverse walls of the hopper adjacent to and inclined upwardly from the feed roll, separate links one connected to one end portion of said gate and the other connected to the other end portion of the gate, and separate and independent lifting devices each comprising a separate actuating arm, one actuating arm being connected to one of said links and the other being connected to the other link, the construction and arrangement being such that said lifting devices are adapted to co-operate with said links to lift either end of the gate along upright slanting lines independently of the other end of the gate and without affecting the adjustment in elevation of the other end.

16. In a material spreader, the combination with a hopper having an open top and a discharge opening in its bottom, of a feed roll for said discharge opening, a flat gate associated with said feed roll, mechanism on the ends of the hopper for guiding the ends of the gate for sliding adjustment relative to the hopper in its own plane, upright links pivotally connected at their lower ends to end portions of said gate, and separate and independent adjusting mechanisms at the ends of the hopper, one pivotally connected to the upper end of one of said links and the other pivotally connected to the upper end of the other link, to enable the adjustment in elevation of either end of the gate without affecting the adjustment in elevation of the other end of the gate, one of said adjusting mechanisms being thus operable at one end of the hopper and the other adjustment mechanism being operable at the other end of the hopper, the construction and arrangement being such that the feed opening between the flat gate and the feed roll may be relatively wide at either end and relatively narrow at the other end.

17. In a material spreader, the combination with a hopper having a discharge opening in its bottom between end plates, of a gate adjustable relative to the rear wall of the hopper at said discharge opening, rearward co-planar extensions from said end plates, upright guideways for the ends of said gate on the inner sides of said extensions, the length of the gate being no greater than the width of the hopper, upwardly extending spaced apart links pivotally connected at their lower ends to the end portions of said gate outside of said hopper, and means mounted on said extensions and pivotally connected to the upper ends of said links to slide either end of the gate up or down along said guideways to vary the feed of material from either end portion of the discharge opening, one of said sliding means being operable at one end of the hopper and the other being operable at the other end thereof and each sliding means being operable independently of the other, the construction and arrangement being such that either end of the gate may be adjusted in elevation without affecting the adjustment of the other end.

18. In a material spreader, the combination with a hopper having a discharge opening, of a gate associated with said discharge opening, a main rock shaft mounted on said hopper, arms extending radially from the ends of said rock shaft, adjustable lifting devices connected between said arms and the end portions of said gate, each lifting device comprising a horizontal auxiliary shaft having fixed thereto a radial arm pivotally connected to a link and the latter pivotally connected to said gate, and latch mechanism between said hopper and one of the arms on the main rock shaft to hold the main rock shaft in adjusted position, the construction and arrangement being such that either end of said gate may be adjusted in elevation independently of the other by said adjustable lifting devices and both ends of the gate may be adjusted in elevation simultaneously by means of the arm having the latch mechanism associated therewith.

19. In a material spreader, the combination with a hopper having a discharge opening in its bottom, of a feed roll associated with said discharge opening, a gate associated with said feed roll, two separate rock shafts one journaled at one end of the hopper adjacent one end of said gate and the other journaled at the other end of the hopper adjacent the other end of said gate, a pair of spaced-apart radial arms permanently fixed to one of said rock shafts, another pair of spaced-apart radial arms permanently fixed to the other rock shaft, links connecting one of each pair of radial arms to end portions of the gate, and actuating devices one connected to the other of each pair of radial arms, each actuating device comprising a nut connected to a radial arm and a manually rotatable rod having a screw threaded through said nut and a journal bearing for such rod, the construction and arrangement being such that by rotating either rod the adjacent end of the gate may be lifted and lowered to adjust the opening between said gate and said feed roll.

FRANKLIN E. ARNDT.